US008630410B2

(12) United States Patent
Suh et al.

(10) Patent No.: US 8,630,410 B2
(45) Date of Patent: Jan. 14, 2014

(54) SIGNAL GENERATOR BASED DEVICE SECURITY

(75) Inventors: Gookwon Edward Suh, Ithaca, NY (US); Srinivas Devadas, Lexington, MA (US)

(73) Assignee: Verayo, Inc., Palo Alto, CA (US)

( * ) Notice: Subject to any disclaimer, the term of this patent is extended or adjusted under 35 U.S.C. 154(b) by 937 days.

(21) Appl. No.: 11/626,639

(22) Filed: Jan. 24, 2007

(65) Prior Publication Data

US 2007/0250938 A1 Oct. 25, 2007

Related U.S. Application Data

(60) Provisional application No. 60/761,821, filed on Jan. 24, 2006.

(51) Int. Cl.
*G06F 21/00* (2013.01)
(52) U.S. Cl.
USPC .................. 380/44; 713/189; 726/34
(58) Field of Classification Search
USPC ........ 713/181, 189; 340/505; 380/44; 726/34
See application file for complete search history.

(56) References Cited

U.S. PATENT DOCUMENTS

| | | | |
|---|---|---|---|
| 4,985,614 A | 1/1991 | Pease et al. | |
| 5,177,352 A | 1/1993 | Carson et al. | |
| 5,180,901 A | 1/1993 | Hiramatsu | |
| 5,204,902 A | 4/1993 | Reeds, III et al. | |
| 5,247,577 A | 9/1993 | Bailey et al. | |
| 5,375,169 A | 12/1994 | Seheidt et al. | |
| 5,388,157 A | 2/1995 | Austin | |
| 5,528,231 A | 6/1996 | Patarin | |
| 5,768,382 A | 6/1998 | Schneier et al. | |
| 5,818,738 A | 10/1998 | Effing | |
| 5,862,094 A | 1/1999 | Kawabata | |
| 5,883,956 A | 3/1999 | Le et al. | |
| 5,920,628 A | 7/1999 | Indeck | |
| 5,963,104 A * | 10/1999 | Buer .............................. 331/78 |
| 6,026,293 A | 2/2000 | Osborn | |
| 6,038,315 A | 3/2000 | Strait et al. | |

(Continued)

FOREIGN PATENT DOCUMENTS

| | | |
|---|---|---|
| CA | 2344429 | 3/2000 |
| DE | 19843424 | 3/2000 |

(Continued)

OTHER PUBLICATIONS

Blaise Gassend et al., "Silicon Physical Random Functions", Massachusetts Institute of Technology, Proceedings of the Computer and Communication Security Conference, Nov. 2002, Memo 456.*

(Continued)

*Primary Examiner* — Ashok Patel
*Assistant Examiner* — Tracy Mangialaschi
(74) *Attorney, Agent, or Firm* — Occhiuti & Rohlicek LLP

(57) ABSTRACT

Subsets of multiple signal generator circuits embodied in a device are selected, and then a volatile value for the device is generated from the selected subsets. The volatile value may be used for authentication of the device and/or for cryptographic procedures performed on the device. The signal generator circuits may each comprise an oscillator circuit, and the selection of the subsets may be according to a comparison of the outputs of the subsets of circuits, for example, according to a comparison of output oscillation frequencies.

7 Claims, 5 Drawing Sheets

(56) References Cited

U.S. PATENT DOCUMENTS

| | | | |
|---|---|---|---|
| 6,047,068 A | 4/2000 | Rhelimi et al. | |
| 6,161,052 A | 12/2000 | Charlton et al. | |
| 6,161,213 A * | 12/2000 | Lofstrom | 716/4 |
| 6,246,254 B1 | 6/2001 | Choukalos et al. | |
| 6,289,292 B1 | 9/2001 | Charlton et al. | |
| 6,289,453 B1 | 9/2001 | Walker et al. | |
| 6,301,695 B1 | 10/2001 | Burnham et al. | |
| 6,305,005 B1 | 10/2001 | Burnham | |
| 6,324,676 B1 | 11/2001 | Burnham et al. | |
| 6,363,485 B1 | 3/2002 | Adams | |
| 6,386,456 B1 | 5/2002 | Chen | |
| 6,402,028 B1 | 6/2002 | Graham, Jr. et al. | |
| 6,529,793 B1 | 3/2003 | Beffa | |
| 6,535,016 B2 | 3/2003 | Choukalos et al. | |
| 6,738,788 B1 | 5/2004 | Horng et al. | |
| 6,802,447 B2 | 10/2004 | Horng | |
| 6,898,708 B2 | 5/2005 | Hori et al. | |
| 6,941,180 B1 | 9/2005 | Fischer et al. | |
| 6,941,536 B2 | 9/2005 | Muranaka | |
| 6,966,022 B1 | 11/2005 | Stenfort | |
| 7,005,733 B2 | 2/2006 | Kommerling et al. | |
| 7,131,001 B1 | 10/2006 | Johnson | |
| 7,143,436 B2 | 11/2006 | Yamaguchi et al. | |
| 7,191,339 B1 | 3/2007 | Trimberger | |
| 7,191,340 B2 | 3/2007 | Wuidart et al. | |
| 7,210,634 B2 | 5/2007 | Sapiro | |
| 7,216,232 B1 | 5/2007 | Cox | |
| 7,243,236 B1 | 7/2007 | Sibert | |
| 7,249,108 B1 | 7/2007 | Walmsley et al. | |
| 7,251,730 B2 | 7/2007 | Rose et al. | |
| 7,380,131 B1 * | 5/2008 | Trimberger | 713/193 |
| 7,568,113 B2 | 7/2009 | Linnartz | |
| 2001/0032318 A1 | 10/2001 | Yip et al. | |
| 2001/0033012 A1 | 10/2001 | Kommerling et al. | |
| 2002/0065574 A1 | 5/2002 | Nakada | |
| 2002/0095594 A1 | 7/2002 | Dellmo et al. | |
| 2002/0106087 A1 | 8/2002 | Lotspiech et al. | |
| 2002/0107798 A1 | 8/2002 | Hameau et al. | |
| 2002/0128983 A1 | 9/2002 | Wrona et al. | |
| 2002/0150252 A1 | 10/2002 | Wong | |
| 2002/0188857 A1 | 12/2002 | Orlando et al. | |
| 2002/0199110 A1 | 12/2002 | Kean | |
| 2003/0140241 A1 | 7/2003 | England et al. | |
| 2003/0204731 A1 | 10/2003 | Pochuev et al. | |
| 2003/0204743 A1 * | 10/2003 | Devadas et al. | 713/200 |
| 2003/0219121 A1 | 11/2003 | Van Someren | |
| 2004/0136529 A1 * | 7/2004 | Rhelimi et al. | 380/44 |
| 2004/0148509 A1 | 7/2004 | Wu | |
| 2005/0051351 A1 | 3/2005 | De Jongh et al. | |
| 2006/0008079 A1 * | 1/2006 | Daemen et al. | 380/28 |
| 2007/0038871 A1 | 2/2007 | Kahlman et al. | |
| 2007/0039046 A1 | 2/2007 | Van Dijk et al. | |
| 2007/0044139 A1 | 2/2007 | Tuyls et al. | |
| 2008/0044027 A1 | 2/2008 | Van Dijk | |
| 2008/0059809 A1 | 3/2008 | Van Dijk | |
| 2008/0106605 A1 | 5/2008 | Schrijen et al. | |

FOREIGN PATENT DOCUMENTS

| | | |
|---|---|---|
| EP | 1100058 | 5/2001 |
| EP | 1341214 | 9/2003 |
| JP | 2001-509908 | 7/2001 |
| JP | 2005-523481 | 8/2005 |
| WO | WO 00/17826 | 3/2000 |
| WO | WO01/50530 | 7/2001 |
| WO | WO02/13452 | 2/2002 |
| WO | WO 02/45139 | 6/2002 |
| WO | WO03/107201 | 12/2003 |
| WO | WO2004/102302 | 11/2004 |
| WO | WO2004/104899 | 12/2004 |
| WO | WO2004/105125 | 12/2004 |
| WO | WO2005/043805 | 5/2005 |
| WO | WO2005/048179 | 5/2005 |
| WO | WO2005/048256 | 5/2005 |
| WO | WO2005/059629 | 6/2005 |
| WO | WO2005/086158 | 9/2005 |
| WO | WO2006/038183 | 4/2006 |
| WO | WO2006/040724 | 4/2006 |
| WO | WO2006/129242 | 5/2006 |
| WO | WO2004/114122 | 6/2006 |
| WO | WO2006/067739 | 6/2006 |
| WO | WO2006/082540 | 8/2006 |
| WO | WO2007/007229 | 1/2007 |
| WO | WO2007/023420 | 3/2007 |
| WO | WO2007/031908 | 3/2007 |
| WO | WO2007/063473 | 6/2007 |
| WO | WO2007/063475 | 6/2007 |
| WO | WO2007/072450 | 6/2007 |
| WO | WO2007/116368 | 10/2007 |
| WO | WO2008/015603 | 2/2008 |

OTHER PUBLICATIONS

Dichtl, Markus, and Norbert Janssen. "A high quality physical random number generator." Proc. Sophia Antipolis Forum Microelectronics (SAME 2000). 2000.*

Milor, L.; Yu, L.; Liu, B., "Logic Product speed evaluation and forecasting during the early phases of process technology development using ring oscillator data", $2^{nd}$ International Workshop on Statistical Metrology, 1997, pp. 20-23.

Ross Anderson et al. "Tamper Resistance—a Cautionary Note". Cambridge University, Cambridge, England. Nov. 1996.

Ross Anderson et al. "Low Cost Attacks on Tamper Resistant Devices". Cambridge University, Cambridge, England. Apr. 1997.

Duane S. Boning et al., "Models of Process Variations in Device and Interconnect," Massachusetts Insitute of Technology, Cambridge, MA Aug. 23, 1999.

Srinivas Devadas et al., "Synthesis of Robust Delay-Fault Testable Circuits: Theory" Massachusetts Institute of Technology, Cambridge, MA Jan. 1992.

Srinivas Devadas et al., "Synthesis of Robust Delay-Fault Testable Circuits: Practice" Massachusetts Institute of Technology, Cambridge, MA Mar. 1992.

Pappu Srinivasa Ravikanth. "Physical One-Way Functions". Massachusetts Institute of Technology, Cambridge, MA. Mar. 2001.

Sean W. Smith et al. "Building a High-Performance, Programmable Secure Coprocessor". IBM T.J. Watson Research Center, Yorktown Heights, NY. Oct. 16, 1998.

Hon-Sum Wong et al. "Three-Dimensional "Atomistic" Simulation of Discrete Random Dopant Distribution Effects in Sub-0.1μm MOSFET's".IEDM, 29(2):705-708, 1993.

Bennet Yee, "Using Secure Coprocessors," Carnegie Mellon University, Pittsburg, PA. May 1994.

Blaise Gassend et al., "Silicon Physical Unknown Functions and Secure Smartcards," Massachusetts Institute of Technology, Cambridge, MA May 13, 2002.

Blaise Gassend, "Physical Random Functions," Massachusetts Institute of Technology, Cambridge, MA Feb. 2003.

Blaise Gassend et al. "Controlled Physical Unknown Functions: Applications to Secure Smartcards and Certified Execution," Massachusetts Institute of Technology, Cambridge, Jun. 10, 2002.

Daihyun Lim, "Extracting Secret Keys from Integrated Circuits" Massachusetts Institute of Technology, Cambridge, MA, May 2004.

Xilinx (Ralf Krueger) "Using High Security Features in Virtex-II Series FPGAs" www.xilinx.com; [printed Jul. 8, 2004].

Lee et al., "A Technique to Build a Secret Key in Integrated Circuits for Identification and Authentication Applications," Massachusetts Institute of Technology (CSAIL) Jun. 2004.

Skoric et al., "Robust Key Extraction from Physical Uncloneable Functions," Proc. Applied Cryptography and Network Security 2005, LNCS 3531, pp. 407-422.

Tuyls et al., "Security Analysis of Physical Uncloneable Functions," Proc. 9th Conf. on Financial Cryptography and Data Security, Mar. 2005, LNCS 3570, pp. 141-155.

(56) References Cited

OTHER PUBLICATIONS

Tuyls et al., "Information-Theoretic Security Analysis of Physical Uncloneable Functions," Proceedings ISIT 2004 (Chicago), p. 141.
G. Edward Suh, et al., "Design and Implementation of the AEGIS Single-Chip Secure Processor Using Physical Random Functions," *In the proceedings of the 32nd International Symposium on Computer Architecture*, Madison, Wisconsin, Architecture, 2005, Jun. (Memo-483)
Patent Cooperation Treaty, *International Search Report*, PCT Application No. PCT/US2007/060964, mailed Aug. 8, 2007 (5 pages).
Ranasinghe et al. "Security and Privacy Solutions for Low-Cost RFID Systems" IEEE, pp. 337-342 (2004).
Suh et al., "Design and Implementation of the AEGIS Single-Chip Secure Processor Using Physical Random Functions," Massachusetts Institute of Technogy, Cambridge, MA [date not available].
Arazi, B. "Interleaving Security and Efficiency Consiederations in the Design of Inexpensive IC Cards". IEEE Proceedings on Computers and Digital Techniques. vol. 141, Issue 5. Publ Date: Sep. 1994. pp. 265-270.
Omura, J.K., Novel Applications of Cryptogrtaphy in Digital Communications, IEEE Comm. Mag., May 1990, pp. 21-29.
Tuyls, Pim and Lejla Batina, "RFID-Tags for Anti-Counterfeiting," Topics in Cryptography, vol. 3860/2006, No. LNCS3860, (Feb. 13, 2005) XP002532233.

\* cited by examiner

SIGNAL GENERATOR BASED DEVICE SECURITY

CROSS-REFERENCE TO RELATED APPLICATIONS

This application claims the benefit of U.S. Provisional Application Ser. No. 60/761,821, "RING OSCILLATOR BASED DEVICE IDENTIFICATION," filed Jan. 24, 2006, which is incorporated herein by reference.

This application is related to the following pending U.S. application Ser. No. 11/273,920, "VOLATILE DEVICE KEYS AND APPLICATIONS THEREOF," filed Nov. 14, 2005, published on Sep. 21, 2006, as US2006/0210082A1; Ser. No. 11/272,995, "SECURELY FIELD CONFIGURABLE DEVICE," filed Nov. 14, 2005, published on Sep. 21, 2006, as US 2006/0209584A1; and Ser. No. 10/407,603, titled "AUTHENTICATION OF INTEGRATED CIRCUITS," filed on Apr. 4, 2003, published on Oct. 30, 2003, as US2003/0204743A1, which are also incorporated herein by reference.

BACKGROUND

This invention relates to use of signal generators for device security.

Secret keys or other values embedded in devices such as integrated circuits (chips) may be used to authenticate the devices. An example of such an approach uses a secret key embedded in a smart card. This secret key is not intended to be read out, but can be used to decrypt messages sent to the smart card. A service provider who knows the secret key can authenticate the smart card by asking it to decrypt an encrypted message or using other cryptographic protocols that verify that the smart card possesses the key. The secret key needs to remain secret so that an adversary cannot duplicate the key and assume a false identity.

Authentication of integrated circuits has been suggested using device characteristics that vary from device to device based on variation in the fabrication process. Some such approaches, which are based on circuit delay are described in U.S. Application Publication US2003/0204743A1, titled "Authentication of Integrated Circuits," which is incorporated herein by reference.

One approach to generating a key that is described in US2003/0204743A1 uses a measurement of a frequency of a self-oscillating circuit. Another approach uses a ratio of the measured frequencies of two self-oscillating circuits. Use of a ratio provides some compensation for variations that are due, for example, to environmental conditions of the circuit.

SUMMARY

In one aspect, in general, subsets (e.g., pairs, three, or more) of multiple signal generator circuits embodied in a device are selected, and then a volatile value for the device is generated from the selected subsets. The signal generator circuits may each comprise an oscillator circuit, and the selection of the subsets may be according to a comparison of the outputs of the subsets of circuits, for example, according to a comparison of output oscillation frequencies.

In another aspect, in general, an integrated circuit includes multiple signal generator circuits, and selection circuitry coupled to the signal generator circuits for outputting a selection of subsets of the plurality of signal generator circuits. The circuit also includes a volatile value generator coupled to the signal generator circuits for outputting a value according to the selected subsets.

In another aspect, in general, software stored on computer-readable media enables a device to perform functions including selecting subsets of a plurality of signal generator circuits embodied in a device, and generating the volatile value for the device from the selected subsets. The software may include data for configuring programmable circuitry to perform the functions (e.g., a personality matrix for and FPGA), or may include instructions (e.g., Verilog) for generating a device specification for fabricating the device.

In another aspect, in general, subsets of a set of signal generator circuits embodied in a device are selected. A volatile value is then generated for the device from the selected subsets.

Aspects can include one or more of the following features.

The signal generator circuits comprise oscillators.

Each subset consists of a pair of circuits.

Each subset comprises a pair of predetermined groups of two or more circuits.

Information characterizing the selection of the pairs is stored, for example, in non-volatile form on or off a device hosting the circuits.

Error correction information is computed from the generated volatile value. The error control information is stored, for example, either on or off the device.

The device is authenticated using the volatile value. The device may also be repeatedly authenticated using repeated re-generation of the volatile value. A cryptographic procedure can also be applied to data at the device using the volatile value.

The volatile value for the device is re-generated from the selected subsets. Re-generating the volatile value can include using stored information characterizing the selection of the subsets of circuits. Re-generating the volatile value can include using stored error correction information computed from the generated volatile value.

Selecting the subsets of circuits and generating the volatile value are performed as part of an enrollment procedure.

Storing information characterizing the selection of the subsets is performed as part of an enrollment procedure.

Generating the volatile value includes generating a different portion of the value from each of the selected subsets. For example, a different bit of the value is generated from each of the selected subsets.

The subsets are selected according to an anticipated error rates associated with corresponding subsets of the circuits.

The subsets are selected according to a comparison of the outputs of the subsets of circuits. For example, the subsets are selected according to a comparison of oscillation frequencies of the subsets of circuits. The subsets with oscillation frequencies that differ according to a predefined criterion may be selected.

In another aspect, in general, an integrated circuit includes a set of signal generator circuits, and selection circuitry coupled to the signal generator circuits for outputting a selection of subsets of the signal generator circuits. The circuit also includes a volatile value generator coupled to the signal generator circuits for outputting an identifier according to the selected subsets.

Aspects cam include one or more of the following features.

The signal generator circuits comprise oscillators.

The integrated circuit includes an interface to the circuit for providing and for retrieving the selection of subsets of the plurality of signal generator circuits. For example, the interface is an interface to an external storage to the circuit.

The integrated circuit includes a storage for the selection of subsets of the plurality of signal generator circuits.

The integrated circuit includes an error correction module coupled to the volatile key generator configured to correct the value outputted from the volatile value generator according to error control information. The circuit can include an interface to the circuit for providing and for retrieving the error control information, for example, from an external storage, and the circuit can include a storage for the error control information.

In another aspect, in general, software is stored on computer-readable media for enabling a device to perform all the steps of any method set forth above.

In another aspect, in general, software is stored on computer-readable media for enabling or causing a device to select subsets of a plurality of signal generator circuits embodied in a device, and to generate a volatile value for the device from the selected subsets.

The software may include data for configuring programmable circuitry (e.g., an FPGA) to perform the functions, or for generating a device specification for fabricating the device (e.g., and ASIC).

The software may include instructions for causing a computing system to perform the functions.

In another aspect, in general, a device is configured to perform all the steps of any of methods set forth above.

Aspects can have one or more of the following advantages.

A unique or relatively unique and unpredictable value can be generated on a device and later re-generated without disclosing the value. This permits authentication and application of cryptographic procedures on the device in a secure manner. The value does not necessarily have to identify the device, but rather provides a degree of unpredictability of the value that is used as a basis for the security of the device.

Other features and advantages of the invention are apparent from the following description, and from the claims.

DESCRIPTION

An approach to generation of a volatile value on a device makes use of a set of signal generators. The volatile value may, for example, be used for authentication of the device and/or for cryptographic procedures (including authentication and data encryption). In some examples, the volatile value is used as a volatile key for cryptographic purposes. An example of signal generators are self-oscillation circuits (e.g., ring oscillators), which are discussed in more detail below. A "volatile" value, such as a binary key, refers to a value that is transient, for example, not being retained when power is removed from a device on which the value is generated or temporarily stored. That is, a volatile value is not stored in a binary form, for example, using fusible links or in a electrically writeable read-only memory, such that the value can be determined from such a stored form. The frequencies of the self-oscillation circuits can be used to generate and repeatedly re-generate a volatile value associated with the device, without that value being discoverable from non-volatile values stored on the device or from values that are exposed outside the device.

In some examples, each of the ring oscillators has the same design, such that absent fabrication-related or environmental variations, each of the ring oscillators would be expected to have the same frequency. For example, each ring oscillator may be formed from a loop that includes a fixed number (e.g., five) inverters that oscillate at approximately 2 GHz.

Figure 1:
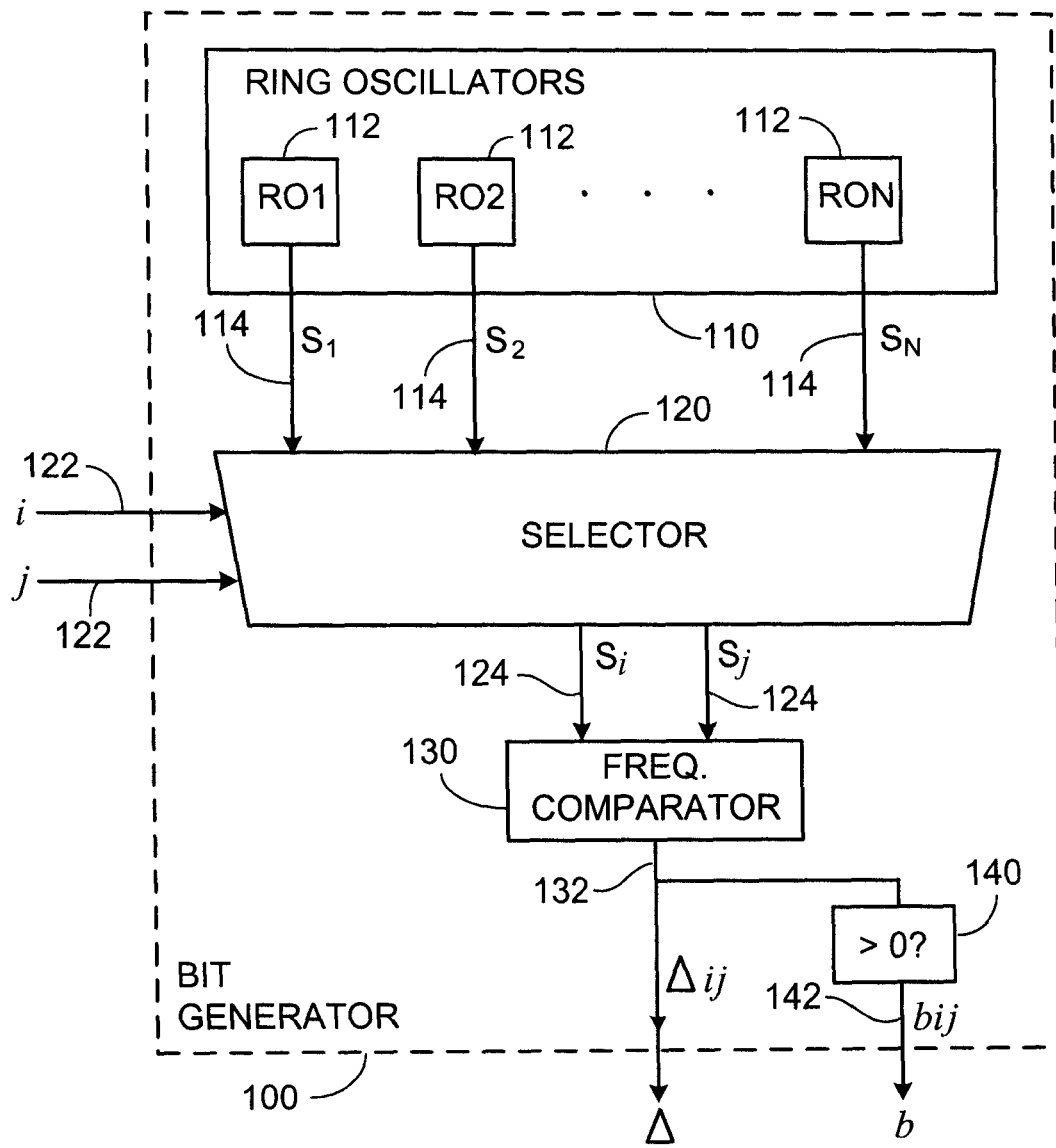
FIG. 1 is a block diagram of a bit generator.

Referring to FIG. 1, some approaches to generating a volatile key makes use of a single bit generator 100 that includes an oscillator circuit 110 that includes N separate ring oscillators 112. Due to fabrication variation, each ring oscillator (k) outputs a periodic signal $S_k$ 114 with a frequency that is generally different from the frequencies of the other oscillators. A selector 120 accepts control inputs 122 that identify two of the ring oscillators, i and j, and passes the corresponding pair of periodic signals $S_i$ and $S_j$ 124 to a frequency comparator 130. The frequency comparator 130 outputs a quantity 132 characterizing a difference $\Delta_{ij}$ in frequencies of the signals (e.g., subtraction $S_i - S_j$, or alternatively division $S_i/S_j$). A one bit output $b_{ij}$ 142 is set to 1 if $S_i > S_j$ (140) and 0 otherwise.

Figure 2:
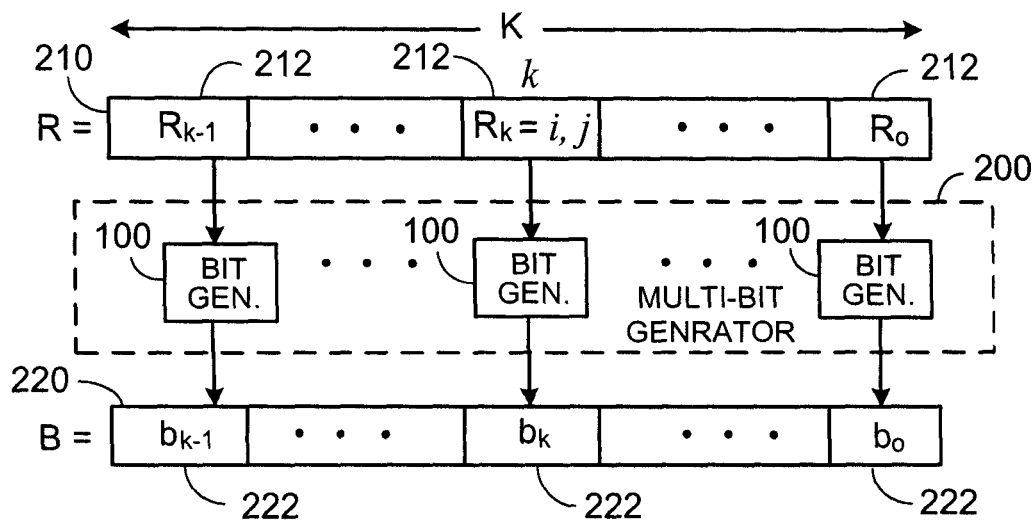
FIG. 2 is a block diagram of a multiple-bit generation approach.

Referring to FIG. 2, a multiple-bit generator 200 makes use of multiple selections of pairs of the ring oscillators, with each pair generating one bit 222 of a multi-bit output B 220, which can be used as a volatile key value. In particular, components 212 of a control input R 210 specify the sequence of pairs of oscillators to use to generate each of the corresponding bits of the multi-bit output. The control input can be determined, for example, from a bit mask of the N(N−1) possible pairs of inputs, or some equivalent data representation.

Figure 3:
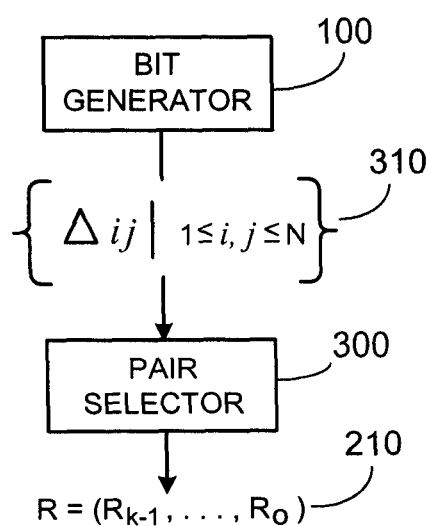
FIG. 3 is a flow chart of a pair selection process.

Referring to FIG. 3, as is discussed further below, the selection of which pairs to use for the control input R may be based on an enrollment time generation of some of all of the N(N−1) quantities $\Delta_{ij}$ 310 characterizing the difference in frequencies of the ring oscillators for a particular device. A pair selector 300 is applied to these differences to generate the control input R 210 or an equivalent specification of the pairs to use in generating the multiple-bit output.

Figure 4A:
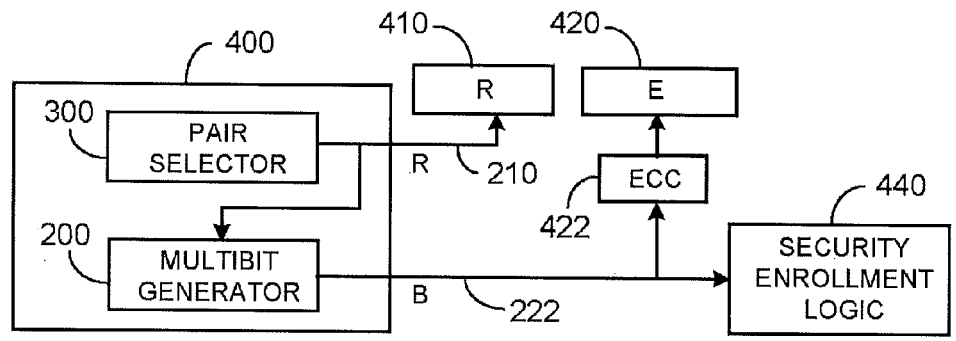
FIGS. 4A and 4B are block diagrams related to enrollment and run-time use, respectively, of a multiple bit generator.

Referring to FIG. 4A, in an enrollment phase, enrollment circuitry 400 on the device includes the pair selector 300 as well as the multi-bit generator 200, which depends on the selection R of pairs of oscillators. The selection R, or a quantity that allows regeneration of R without disclosing R in a non-volatile manner, is stored 410 on or off the device. The volatile key B is used on the device, for example, by security enrollment logic 440. Optionally, an error correcting code (ECC) module 422 generates error correction information E 420, which is also stored on or off the device.

Figure 4B:
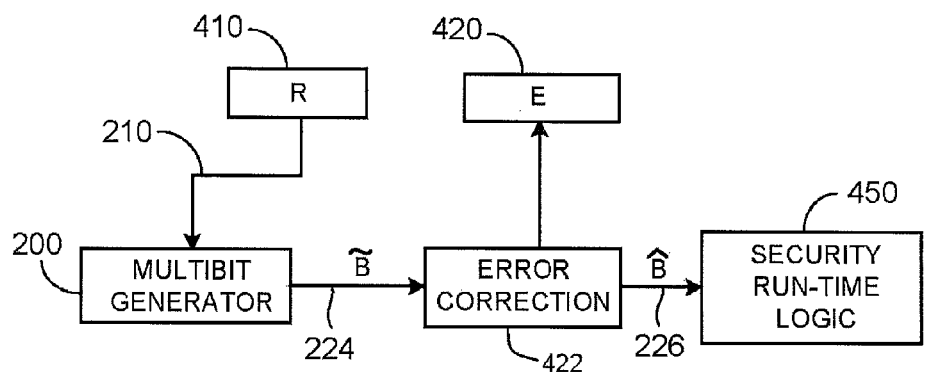

Referring to FIG. 4B, in a use phase (i.e., at "run time"), the quantity R is passed to the multi-bit generator 200, which generates $\tilde{B}$ 224 which is a version of B with possible bit errors. This generated value is passed to an error correction module that makes use of the saved error correction information E to generate $\hat{B}$ 226 which typically matches the value of B generated during the enrollment phase. This error corrected value is then used, for example, by security run-time logic 450.

In general, given N oscillators on a device, there are N! (N factorial) different orderings of the frequencies of the N oscillators. Each ordering is equally likely assuming that the frequencies are independent. Therefore, the N(N−1) pairwise comparisons of frequencies provides $\log_2(N!)$ independent bits of information. For example:

| N | Pairs (=N(N−1)) | bits (=log2(N!)) |
|---|---|---|
| 35 | 595 | 133 |
| 128 | 8128 | 716 |
| 256 | 32640 | 1687 |

In practice, for a particular device, bits generated from comparison of different pairs of oscillators exhibit different probabilities of error (i.e., flipping of that bit) between enrollment and run-time use. For example, two oscillators that have almost identical frequencies may on one use (e.g., enrollment) have one ordering, and on another use (e.g., at run time) have the opposite ordering. One approach to handling this phenomenon is to use the error correction approach outlined above to correct such errors. Because a limited number of pairs of oscillators will have such close frequencies, a limited number of such bit errors will have to typically be corrected.

Another approach to address this effect essentially uses a predicted error rate for particular pairs of oscillators determined during the enrollment phase and uses this prediction in the selection process for pairs of oscillators. For example, the frequency differences $\Delta_{ij}$ are used as proxies for the error rate, with small differences between frequencies being uses as a prediction of a high error rate.

Selection approaches, some of which are described below, can reduce the error rate and make it possible to avoid the need for an error correction phase altogether, or at least allow use of a simplified error correction approach, for example, that may be simpler than use of a BCH error correction approach.

Figure 5:
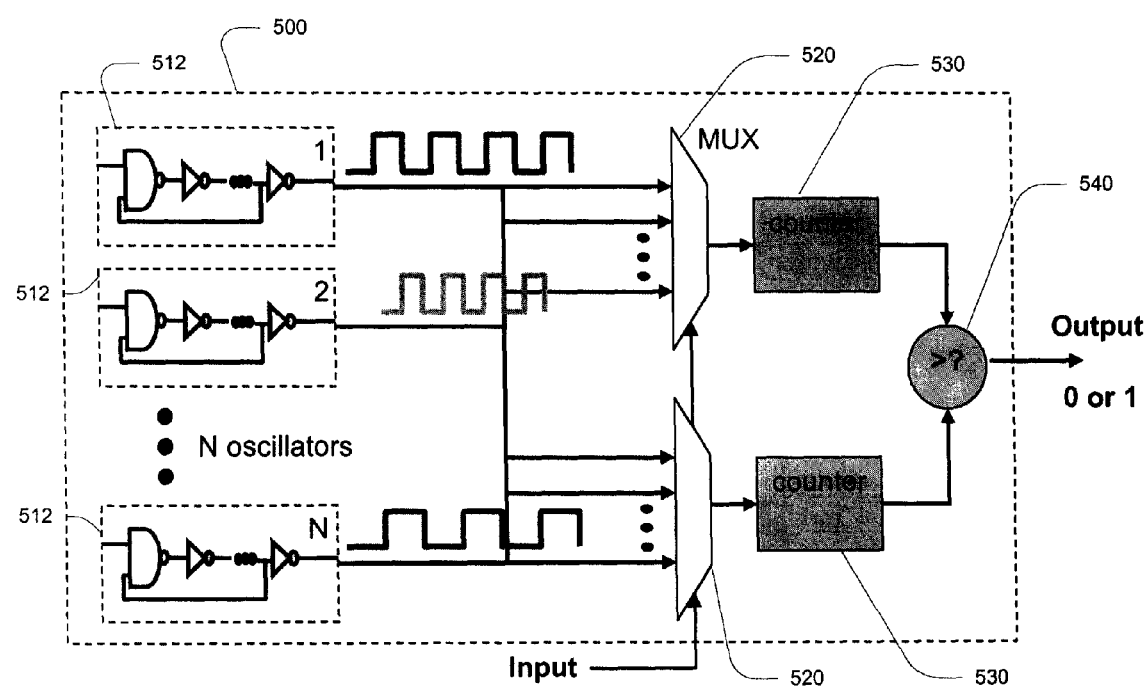
FIGS. 5 and 6 are embodiments of a bit generator.

Referring to FIG. 5, an implementation 500 of a bit generator makes use of N ring oscillators 512. The outputs of all the oscillators are fed to two multiplexers 520, which together select the outputs of a pair of the oscillators. The output of each of the multiplexers is fed to a counter 530. At the end of a sampling interval in which the counters start at a common count (e.g., zero), the outputs of the counters are passed to a comparator 540, which determines the output bit value according to which counter has a larger value. The implementation 500 can be used to time-serially generate multiple bits with different control input values selecting the oscillator signals to feed to the counters for each bit to be generated. Alternatively, multiple instances of the selectors and counters can be used to generate multiple bits concurrently.

Figure 6:
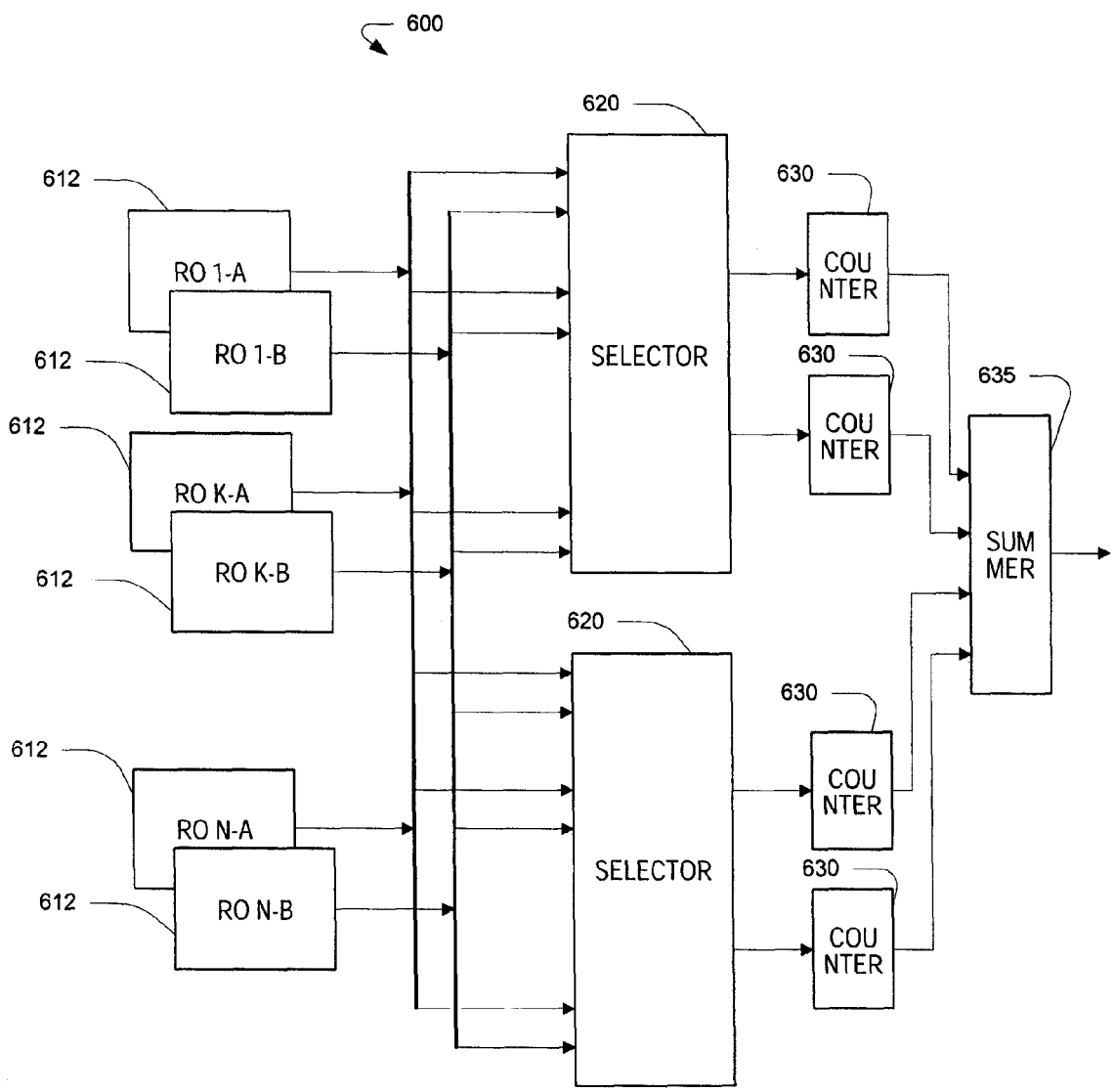

Referring to FIG. 6, in another implementation 600, oscillators 612 are placed on a device in pairs (e.g., adjacent or in close proximity to one another), and it is a difference (e.g., absolute difference) in frequency between the two oscillators of such a pair of oscillators, rather than an absolute frequency of one oscillator, that is compared with the difference of another pair with the pairs being selected according to the control inputs. For example, oscillation frequency may have an overall trend across a fabricated chip that may be due to operating temperature variations across the chip. Such a trend can result in a degree of predictability (or equivalently lower probabilistic entropy) of the relative frequencies of different oscillators. The systematic skew may imply that more ring oscillators are needed to generate a certain number of unpredictable bits.

Some fabrication approaches may be more susceptible to systematic skew. For example, systematic skews may be less significant in ASIC implementations than in FPGA implementation. In examples of ASIC implementations, each dimension of the ring oscillator array may be 100-1000 times smaller than in FPGA implementations, which may reduce significance of the skew effect as compared to other localized factors.

In some examples, the mechanism illustrated in FIG. 6 essentially eliminates systematic skew such as may be found in FPGA implementations. This mechanism reduces/eliminates low frequency systematic skew by using the distance D=|F1−F2| between frequencies of adjacent ring oscillators instead of ring oscillator frequencies themselves. These distances, or "delta" frequencies are compared to generate key bits.

The implementation shown in FIG. 6 has N pairs of oscillators 612. A control input causes the signals from one pair (e.g., from ring oscillators j-A and j-B) through one of the selectors 620 to two counters 630 and the signals from another of the pairs (e.g., k-A and k-B) to two other counters 630. A summer 635 takes the difference between the counters from each of the pairs. That is, if C[j-A] represents the count from the selected A counter from the jth pair, then the summer computes |C[j-A]-C[j-B]|−|C[k-A]-C[k-B]|.

Several examples of approaches to selecting the pairs of oscillators (or in the case of approaches such as shown in FIG. 6, pairs of localized oscillator pairs) for generation of successive bits in a key value make use of measurements related to the oscillators' characteristics on a particular device. This selection can be done internally on the chip without necessarily disclosing the selected pairs outside the device.

In a first example, an ordering of the frequencies of all the ring oscillators is identified on a chip to generate the bits of the volatile key. In examples in which there are N ring oscillators, the frequency of the $i^{th}$ oscillator is denoted $f_i$. To find the ordering of the oscillators, a processing element on the chip compares all possible pairs of ring oscillators (i,j) and generates 1 if $f_i > f_j$ (i≠j) otherwise 0. This scheme generates (N*(N−1)/2) bits from N ring oscillators, which effectively represent N! (N factorial) possible orderings or $\log_2(N!)$ independent bits.

In an experiment in which all pairs were compared, the probability of a flip of a bit was compared according to the frequency separation of the oscillators used to generate the respective bits. For oscillators with 5 inverters the bits generated by oscillator pairs that have frequencies more than 2 MHz apart were essentially error free.

Another example generates bits only from pairs of oscillators that have frequencies that are sufficiently different (e.g., different by at least 2 MHz) such that they generate response bits that do not necessarily require additional error correction schemes. During an enrollment phase, the frequencies are compared, and data representing the list of sufficiently separated pairs is stored on or off the device. A challenge to applying this example of only using "robust" pairs to generate response bits is to ensure a device will use the same set of pairs even with environmental variations without leaking information in the data stored on or off the device. For example, a device can generate a bit-vector (i.e., one bit for each (i,j) oscillator pair) during an enrollment phase, which indicate whether to use each pair or not. However, depending on how this bit-vector is stored and accessible, information about which ring oscillators are close to each other may be exposed.

In another example, the frequency of each ring oscillator is compared to an average frequency of all the ring oscillators. If an oscillator is faster than the average, the response associated with that oscillator is 1, otherwise 0. Therefore, in this example, N bits are generated from N oscillators. A subset of the oscillators is selected according to how different their frequencies are from the average, with the oscillators close to the average not being used to generate the volatile key. The identification of the oscillators with frequencies sufficiently different than the average can be stored on or off the device and later used to regenerate the volatile value. Note that this identification information does not reveal any information whether any particular oscillator is faster or slower than the average frequency.

One possible limitation of this example that may outweigh advantages (such as less revealed information) in some applications is that response bits may not be uniformly distributed. Because a bit is generated by comparing a ring oscillator frequency with the average obtained on the chip, response bits from different oscillators may be correlated. For example, if there are only two ring oscillators (n=2), then the average frequency is always between the two ring oscillator frequencies, resulting in the response of either 10 or 01, but not 00 or 11.

Some examples follow the general approach illustrated in FIGS. 4A-B, but have a goal to replace the error correcting code or to reduce the complexity of the error correcting code by reducing the error rate. For calibration, a chip generates error reduction (correction) information (E) as well as a response (B). To re-generate the same response, the chip is given the same error reduction information.

In some examples, for calibration of a device with N oscillators, an N-bit mask is generated that indicates whether to use each oscillator or not. For example, a bit in the mask is set if the corresponding oscillator frequency is too close to the average or the corresponding (e.g., adjacent) pair consists of oscillators with very close frequencies. For re-generation, only oscillators or pairs whose mask bit is not set are used.

In some examples, for calibration of a device with N oscillators, an $M=N*(N-1)/2$ bit mask is generated that indicates whether to use each pair of oscillators or not. The bit is set if the corresponding pair consists of oscillators with very close frequencies. Optionally, in order to prevent adversaries from guessing the ordering of oscillators from the mask, some additional bits of the M-bit mask are randomly set so that it is difficult to guess if a certain oscillator pair is close or not. For re-generation, only oscillator pairs whose mask bit is not set are used. The mask bit can be compressed to save storage space.

In some examples, rather than storing a bit vector or a compression of the bit vector, a quantity that can be used to generate a bit vector is stored, and the bit vector is generated when needed. For example, the quantity can be a seed for a pseudo-random number generator, such as a Linear Feedback Shift Register (LFSR). In order to generate a suitable bitvector, a number of seeds can each be tested according to the quality of the resulting bit vector measured according to the quality of the volatile value that is generated. For example, for a particular seed value, M oscillator pairs are generated from the seed, and the probability of each bit error on re-generation of the associated M-bit volatile value is estimated using the difference between the compared oscillator frequencies. The error probabilities for the bits in the volatile value are summed to get the expected number of bit errors for the value as a whole. The initial seed is changed, and the process is repeated. The seed that produces M response bits with lowest expected number of errors is chosen. This seed is publicly stored on or off-chip, essentially serving the function of the pair selections (R) in FIG. 4A. An ECC is optionally chosen based on the expected number of errors.

In some examples, the possible $N*(N-1)/2$ oscillator pairs are split in a predetermined manner into P groups, each of which has K oscillators (i.e., $N*(N-1)/2=P*K$). During calibration, a (K-1) bit vector is generated per group. The (K-1) bits in the vector for a group is obtained by XORing a bit generated from the first oscillator pair of the group with each of the $2^{nd}$ through $K^{th}$ bits generated from the other pairs in the same group. These P (K-1)-vectors are publicly stored on- or off-chip. During re-generation, the bits from each ring oscillator pair are generated. For a given group, the (K-1) bit vector is again generated and XORed with the stored (K-1) bit vector for that group. Majority voting over the resulting (K-1) bit vector is used to determine if the bit generated from the first pair of the group flipped or not.

To elaborate, consider that we have K=4, and a particular group corresponds pairs that generate bits r1, r2, r3, r4. We generate r1 xor r2, r1 xor r3, r1 xor r4, and store it away during calibration. During re-generation, the originally generated bits r1, r2, r3, r4 are not known with certainty, and the same pairs generate new bits r1', r2', r3', r4'. Rather than using r1' in place of r1, we then compute (r1 xor r2 xor r2'), (r1 xor r3 xor r3'), and (r1 xor r4 xor r4') and use the majority vote of these three bits as the re-generated value of r1.

In some examples, the N oscillators divided to form M groups, each of which consists of K oscillators (N≥M*K). Groups are determined at an enrollment time in a way that oscillator frequencies across different groups are as far apart as possible. The oscillator frequencies within a group are close to each other. In order to achieve this, some oscillators can be eliminated (not included in any group). To generate bits, the groups are compared by pair-wise comparisons and majority voting. That is, the first oscillator in a group A is compared to the first in another group B, the second oscillator in group A is compared to the second in group B, etc. A majority vote is taken in order to determine the response bit. That is, each pair of groups generates one bit of the volatile value according to whether the group as a whole has a higher or lower frequency.

In some examples, an error correction approach is tailored to account for the different probability of error of each of the bits in a re-generated volatile value. For example, more redundant bits are used to protect bits that are more likely to be erroneous. This optimization can lead to a smaller total number of syndrome bits (E).

Given that an enrollment time or at re-generation time it is known which bits are likely to have errors and that only a small number of bits are likely to flip, errors can be corrected using a searching approach. During enrollment, a one-way hash of the volatile value is stored. To re-generate bits of the volatile value (B), we first re-generate the value (B̂), which could have errors in a few positions in comparison to the calibrated value. Given that we have knowledge at re-generation time of the positions that are likely to have errors in the re-generated values, different 0/1 combinations of the potentially erroneous bits are tried, for each try computing the hash and compare with the stored hash to see if we have obtained the value B. This search continues until the value B is re-generated.

In some examples, error control information (E) and/or selection information (R) is not required to be stored. Such examples, may have advantages because device specific information is not retained after calibration.

In some examples, the bits generated from pairs of oscillators are determined based on a comparison of their frequencies with an offset. In one such example, a pair of oscillators (i,j), for i≠j may generate a 1 $f_j-t<f_i<f_j+t$ otherwise 0. In another such example, a pair of oscillators (i,j), for i≠j may generate a 1 $f_i>f_j+t$ otherwise 0.

Embodiments of approaches described above can use a variety of chip technologies. For example, oscillators can be placed on a FPGA (field programmable gate array) or designed into an ASIC (application specific integrated circuit). The characteristics of the oscillators, such as the within-chip, across-chip, or temperature or voltage dependent variation of oscillator frequencies can be used to predict performance. For example, bit error rate of the volatile keys can be predicted based on fabrication process characteristics of the devices hosting the oscillators. The predicted performance can then be used to select a number of oscillators or a degree of error correction that is suitable to achieve desired characteristics of the volatile values that are regenerated on the devices.

Approaches described above can be combined with approaches described in the copending applications that are incorporated into this document by reference. For example, the volatile value generated by the oscillators can be combined with a challenge presented to the device to produce a response to the challenge. As another example, the volatile value can be used to generate public/private cryptographic key pair, such that the private key is not disclosed outside the device.

The approaches described above for selection of pairs or ring oscillators can be used for selection of subsets of more than two oscillators or for selection of signal generators other than oscillators. Also, other characteristics than frequency of signal generators may be used.

Approaches described above can be implemented on a device in dedicated logic circuitry, using a processor controlled by stored instructions, or a combination of dedicated circuitry and processors. The instructions for a processor may be stored in a machine-readable medium (e.g., ROM) on or off the device. For example, the processor may comprise a general-purpose processor core that uses instructions that are stored off the device to control oscillator selector circuitry and processes oscillation counts to determine the bits of a volatile value. Storage of values, such as selection information or error control information, can use a variety of technologies, including flash memory, electrically writeable read-only memory, fusible links, etc. Some implementations can be represented as instructions or data for configuring a FPGA, or in instructions or data (e.g., Verilog) that is used to specify a circuit design of an ASIC.

It is to be understood that the foregoing description is intended to illustrate and not to limit the scope of the invention, which is defined by the scope of the appended claims. Other embodiments are within the scope of the following claims.

What is claimed is:

1. A method comprising:
    repeatedly regenerating a cryptographic key in an integrated circuit;
    wherein regenerating the key includes:
        for each of a series of portions of a volatile value,
            selecting a configuration of a plurality of fixed oscillator circuits embodied in the integrated circuit, the configuration including a first plurality of oscillator circuits and a second plurality of oscillator circuits, the oscillation frequency of each oscillator circuit depending on fabrication characteristics of the semiconductor device,
            generating a plurality of numerical values, including generating a first numerical value dependent on the oscillation frequency of each of the oscillator circuits of the first plurality of oscillator circuits, and generating a second numerical value dependent on the oscillation frequency of each of the oscillator circuits of the second plurality of oscillator circuits, and
            forming the portion of the volatile value using the first numerical value and the second numerical value; and
        generating the cryptographic key using the volatile value.

2. The method of claim 1 wherein generating the cryptographic key using the volatile value includes error correcting the volatile value.

3. The method of claim 1 wherein generating the plurality of numerical values includes applying a positive contribution to at least one of the numerical values according to the oscillation frequency of each of a plurality of the oscillator circuits and applying a negative contribution to at least one of the numerical values according to the oscillation frequency of each of a plurality of the oscillator circuits.

4. The method of claim 3 wherein generating the first numerical value includes applying a positive contribution according to the oscillation frequency of at least one of the oscillator circuits and applying a negative contribution according to the oscillation frequency of at least another of the oscillator circuits.

5. The method of claim 4 wherein at least one of generating the first numerical value and using the first numerical value in forming the volatile value includes applying a non-linear operation to a value dependent on the oscillation frequencies of a plurality of the oscillator circuits.

6. The method of claim 1 further comprising accepting a seed value, and determining the configuration for each of the plurality of portions of the volatile value from the seed value.

7. The method of claim 6 wherein determining the configuration for each of the plurality of portions includes applying a Linear Feedback Shift Register (LFSR) initialized according to the seed value.

* * * * *